(12) United States Patent
Koch et al.

(10) Patent No.: US 8,185,562 B2
(45) Date of Patent: May 22, 2012

(54) BUSINESS OBJECT BROWSER FOR BUSINESS QUERY LANGUAGE

(75) Inventors: Wolfgang Koch, Östringen-Odenheim (DE); Christine Hörner, Karisdorf-Neuthard (DE)

(73) Assignee: SAP AG, Walldorf (DE)

( * ) Notice: Subject to any disclaimer, the term of this patent is extended or adjusted under 35 U.S.C. 154(b) by 374 days.

(21) Appl. No.: 12/340,482

(22) Filed: Dec. 19, 2008

(65) Prior Publication Data

US 2010/0162141 A1 Jun. 24, 2010

(51) Int. Cl.
*G06F 17/00* (2006.01)
(52) U.S. Cl. ........ 707/805; 707/706; 707/713; 707/758; 707/781; 707/802; 707/803; 707/812; 707/809; 715/808; 715/764; 715/810
(58) Field of Classification Search .................. 707/706, 707/713, 758, 781, 802, 805, 803, 809, 812, 707/999.102, 999.001; 715/808, 764, 810
See application file for complete search history.

(56) References Cited

U.S. PATENT DOCUMENTS

| 6,996,589 B1 | 2/2006 | Jayaram et al. |
| 7,110,997 B1 * | 9/2006 | Turkel et al. ................. 707/713 |
| 2006/0095332 A1 | 5/2006 | Riemann et al. |
| 2008/0189655 A1 * | 8/2008 | Kol et al. ...................... 715/808 |

OTHER PUBLICATIONS

"European Search Report of the European Patent Office", mailed Oct. 26, 2009, for EP 09012584.0-1238, 2pgs.

* cited by examiner

*Primary Examiner* — Syling Yen
(74) *Attorney, Agent, or Firm* — Buckley, Masachoff & Talwalkar LLC

(57) ABSTRACT

A method and graphical user interface, the graphical user interface includes a search tool to search for and retrieve specific business object (BO) data located in a business object (BO) database; a business query language (BQL) statement creation tool to create a BQL statement based on the specified BO data; and a BQL execution engine to execute the BQL statement created by the BQL statement creation tool of the graphical user interface. The method includes specifying a BO to search for using a search tool of the graphical user interface; retrieving, from a BO database, BO data associated with the specified BO; creating a business query language (BQL) statement using a BQL creation tool of the graphical user interface based on the specified BO; and executing the BQL statement using a BQL execution engine of the graphical user interface.

15 Claims, 7 Drawing Sheets

US 8,185,562 B2

BUSINESS OBJECT BROWSER FOR BUSINESS QUERY LANGUAGE

FIELD

Some embodiments herein relate to business object modeled user interface. In particular, some embodiments concern a Business Object Browser to facilitate search and query of Business Object data using a Business Query Language.

BACKGROUND

As business oriented computing systems, applications, and platforms increase in complexity, the amount of data processed thereby, including enterprise platforms, also increases in breadth and complexity. While the accurate modeling of business transactions, interactions, and relationships between different business entities by Business Objects (BOs) may be a key aspect or goal, the querying, analyzing, and reporting of query and analysis results related to the BO data may be useful in providing a business entity with the information necessary to improve the operation and management of their business. However, a particular user or business entity may only desire to search and retrieve business data relevant to their operations or area of concern. As such, all of the BOs and associated attributes of those BOs may not be pertinent to a particular user, application, process, or service.

The task of searching a BO database, repository, data store, platform, or service containing and defining BO data may be facilitated by the use of a database query language designed for querying and modifying the data and managing the database, repository, data store, or platform. In some regards, the generation of query statements using the query language to search a database is complicated by the need for a user to have some knowledge of the syntax and structure of the query language in order to generate a proper query language statement that will execute to query, modify, or manage the database. In some other regards, searching of all of the data of the entire database, repository, data store, platform, or service containing the BO data may be unduly time and resource hungry given the user is interested in specific object data. Additionally, the tasks of searching the database and generating and executing query language statements may be further complicated by each task operating and/or being controlled by a different program and/or user interface.

Accordingly, a method and mechanism for a graphical user interface for selectively and strategically searching and retrieving BO data and/or attributes thereof are provided in some embodiments herein.

DETAILED DESCRIPTION

Business Query Language BQL is an object driven database computer language for handling the retrieval and management of BO data in a business object modeled database, platform, or service. BQL is designed, provided, and supported by SAP AG. BQL can be used to manage BO data of a business platform, application, and service, providing a mechanism to access BO data.

Figure 1:
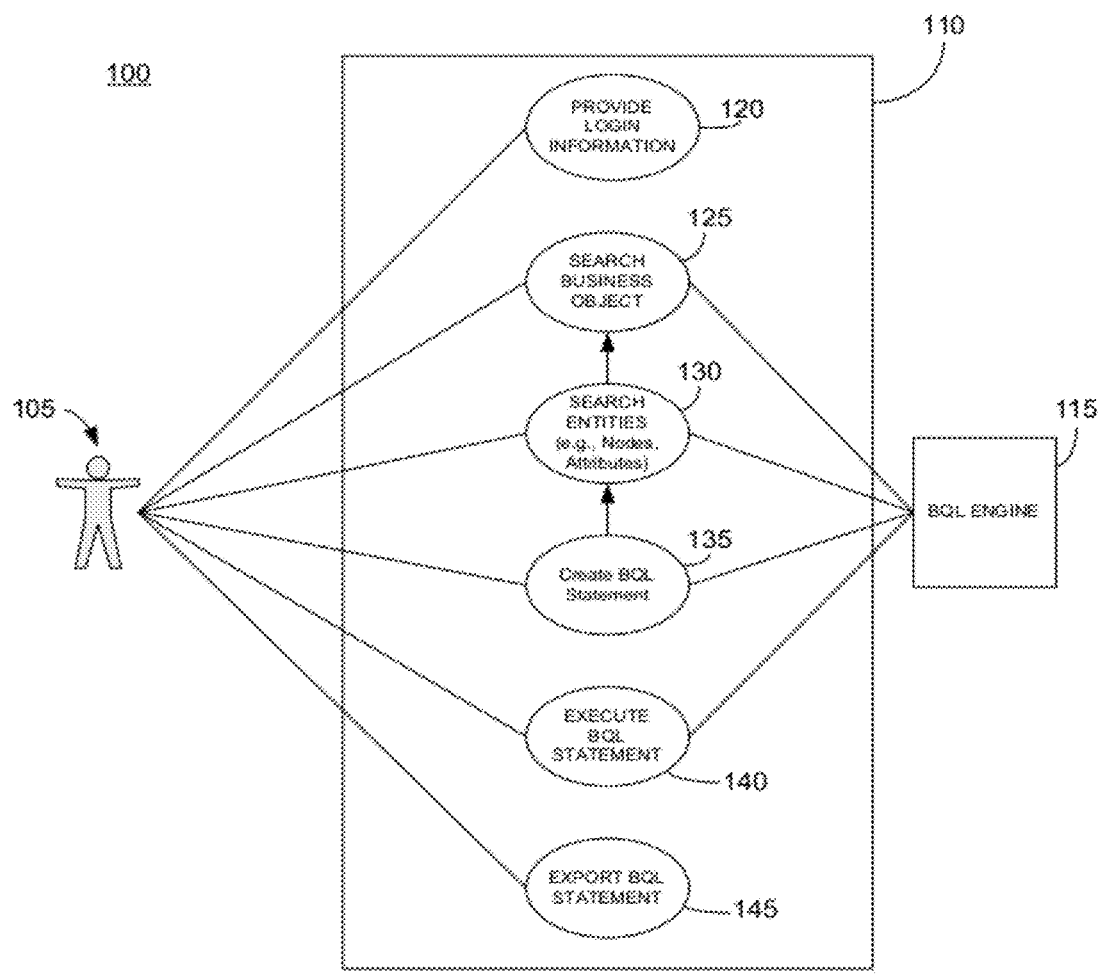
FIG. 1 is an exemplary block diagram illustrating an operating environment, in accordance with various aspects of the present disclosure.

FIG. 1 is an illustrative depiction of an operating environment 100, in accordance with some embodiments herein. FIG. 1 illustrates a relationship between a user 105, a graphical user interface (GUI) business object (BO) browser 110, a business query language (BQL) engine 115. Data and meta data associated with Business Objects (BOs) sit behind BQL engine 115 in an application platform (AP). All data and meta data request are dispatched in BQL engine 115. Data requests may be dispatched to the actual BOs, such as for example, SalesOrder, BusinessPartner, etc., the AP. In some embodiments, meta data requests may be dispatched to the meta data repository of the AP.

In some embodiments, user 105 (e.g., an end-user) may be a human. In some embodiments the user may be a person or a machine, application, or service. User 105 may use BO browser 110 to generate BQL statements using BQL engine 115 and to request BO data from a BO database supported by business platform 150.

In some instances, a BO database or repository may include much more detailed information that is necessary or relevant for creating a BQL statement, such as creating a BQL query statement to implement queries of a BO. In some embodiments herein, for generating a BQL statement (e.g., query or modification statement) only the nodes, associations and attributes of a BO are essential. The nodes group the different attributes, which represent the data that is accessed by a BQL statement. The associations relate the nodes of a BO to each other and are relevant for showing the structure of a BO. In the instance of a BQL action statement, BO nodes and their actions with the parameters are included.

For a BQL meta-data query such as those captured by the creation of BQL statements herein, name and namespace of these entities are requested from the BO database or repository. Additionally, for specified associations the classification, the target node name and the namespace are delivered. In some embodiments herein, only the data necessary for generating a BQL statement is retrieved from the BO database, data store, or repository and displayed to the user. Data not required for the generation of the BQL statement is neither retrieved nor displayed.

FIG. 1 illustrates a number of uses or functionalities provided by BO browser 110, including the relationship between user 105, BO browser 110 use cases 120-145, and BQL engine 115 that handles the requests and responses related to the potential uses of the associated BO data in creating a BQL (query) statement. In some embodiments, BO browser 110 may provide the functionalities or uses of, but not limited to, "Provide Login Information" 120, "Search Business Object" 125, "Search Entities" 130, "Create BQL Statement" 135, "Execute BQL Statement" 140, and "Export BQL Statement" 145.

The functionality of "Provide Login Information" 120 is provided to receive, for example, server information, system details, and username and password authentication that may needed to access and use BO browser 110. Functionality "Search Business Object" 125 provides a tool or mechanism to search for a BO using the BO browser 110. Functionality "Search Entities" 130 uses "Search Business Object" 125 to obtain the BO specified by the user. The nodes, attributes, and association of the BO specified by the user are used to locate and obtain the searched for BO data from platform server 150 that includes the specified BO data. Using the specified BO, the user may further specify or select the associated entities of the BO.

Regarding the creation of a BQL statement, the functionality "Create BQL Statement" 135 uses the searched and selected entities, including the nodes, associations and attributes from "Search Entities" 130. In some embodiments herein, the BO browser may execute the created BQL statement. In this manner, the BO browser may verify the proper creation of a valid BQL statement associated with the specified BO. The functionality "Execute BQL statement" 140 provides the mechanism for executing the BQL statement. In some embodiments, a BQL statement created by BO browser 110 may be export to an application, service, or program using the functionality "Export BQL Statement" 145.

Figure 2:
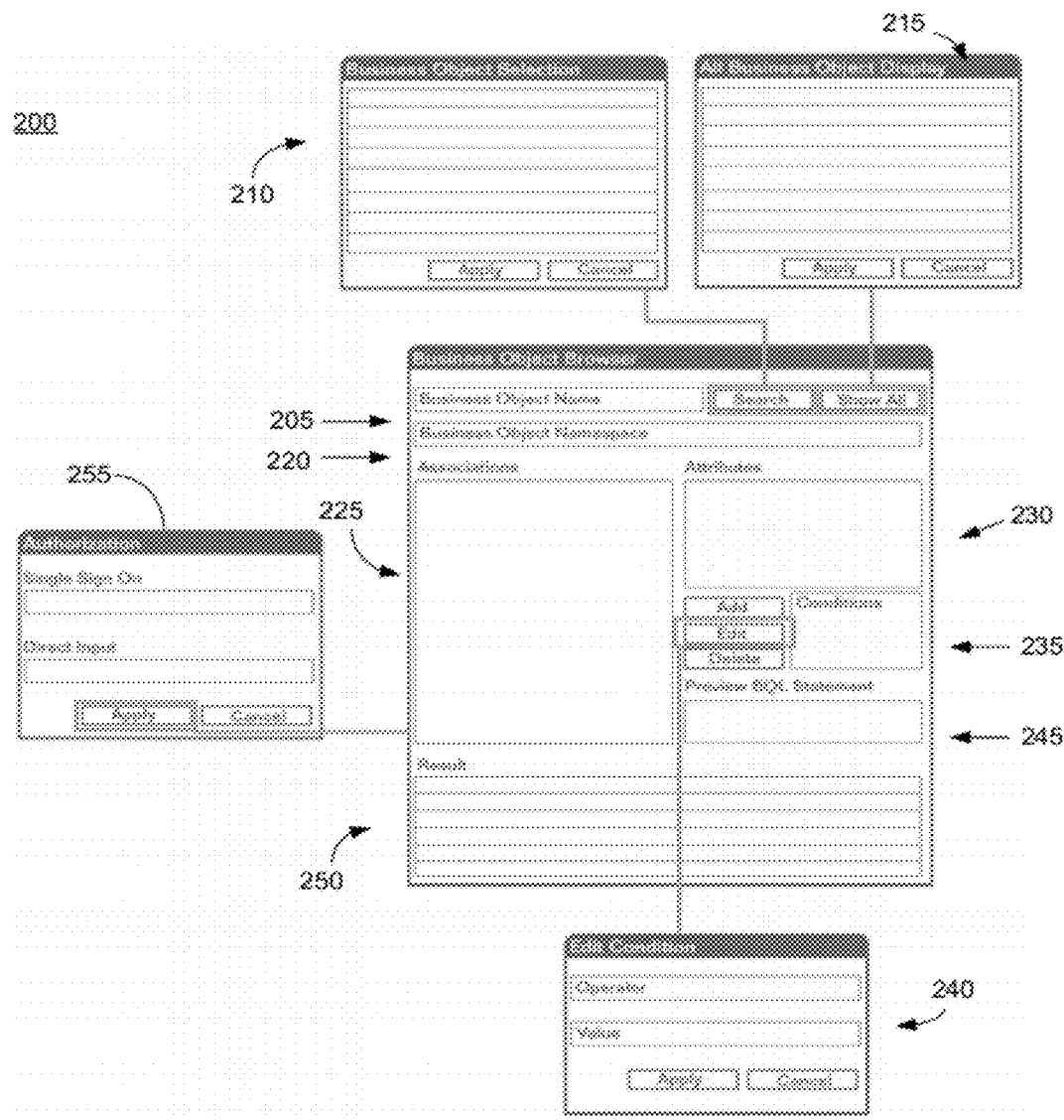
FIG. 2 is an exemplary layout of a graphical user interface, in accordance with some embodiments herein.

FIG. 2 is an illustrative depiction of a GUI of a BO browser 200, in accordance with some embodiments herein. BO browser 200 illustrates an overall layout of the BO browser's GUI. It is noted that the particular layout of BO browser 200 may vary to include more, fewer, or different layout configurations and components than those particularly depicted in FIG. 2.

User authorization tool 255 is provided to facilitate secure and authorized access and operation of the BO browser 200, including the access to platforms, services, databases, and other applications (not shown) that may be interfaced with or cooperatively operating with BO browser 200. User authorization tool 255 may be used to determine whether a user is authorized or has proper permission before BO browser 200 grants access to the functionality of the BO browser to the user. In some embodiments, the authorization and the declaration of associated server information are handled within the one window form 255. After the authorization, the main window form 200 may be presented to the user.

The BO browser herein may typically access BOs associated with a business, organization, or enterprise. As such, confidential business data may be included in the BA data accessed by the BO browser. Accordingly, security issues are considered ad addressed by the BO browser.

The BO browser prototype benefits from, for example, noted mechanisms offered by the .NET Connector provided by Microsoft Inc. by using its classes for implementing the user authorization with single sign-on. In some embodiments, an operating environment may not system allow the logon by a single sign-on. The BO browser may then allow a user to login directly using a username and a password.

Therefore, a Security Network Communications may be configured for the single sign-on implementation method within the BO browser.

In some embodiments, various application interfaces and components may be included or extended to the BO browser herein. in such a manner, the BO browser may be integrated with other applications and services. For example, .NET components, such as those provided by Visual Studio may be included such that the BO browser may be integrated with that program.

Main BO browser window form 200 supports the core functionality of the BO browser herein. For example, a quick search for BOs may be initiated by the specification of a BO at 205. Specification of a BO may include the use of search wildcards in requesting a BO. A separate window form "Business Object Selection" 210 may be provided in the instance multiple BOs are returned in response to a search. Window form 210 may display a listing of matching BOs from which a user may select a particular desired BO. Window form "All Business Object Display" 215 may be provided to present a listing of all of the BOs in an associated BO database, platform repository, or other data store in response to a selection of "show all" of the BOs.

The namespace of the selected BO may be provided at 220. The display of a BO and its associated nodes (i.e., associations) and attributes may also be provided. Some embodiments include an "Associations" window 225 and an "Attributes" window 230 in BO browser 200. These windows may provide a display of the nodes and attributes of the specified BO, respectively.

To facilitate the building of a BQL statement, a where-condition for a certain leaf-like BO attribute is provided, added, and edited over supplemental window 240. Where-conditions may be added, edited, and deleted at 235. A BQL statement preview window 245 is provided to present a BQL statement as it is generated using BO browser 200. In some embodiments, a BQL statement generated by BO browser 200 may be executed by the BO browser, with the results of the execution of the BQL statement presented in the "Result" window 250.

In this manner, BO browser 200 provides a GUI that provides, supports, or otherwise facilitates the searching of BOs (e.g., BO meta-data), the creation of BQL statements using the BO data obtained as a result of the BO searching, and the execution of the BQL statements from a common tool.

Figure 3:
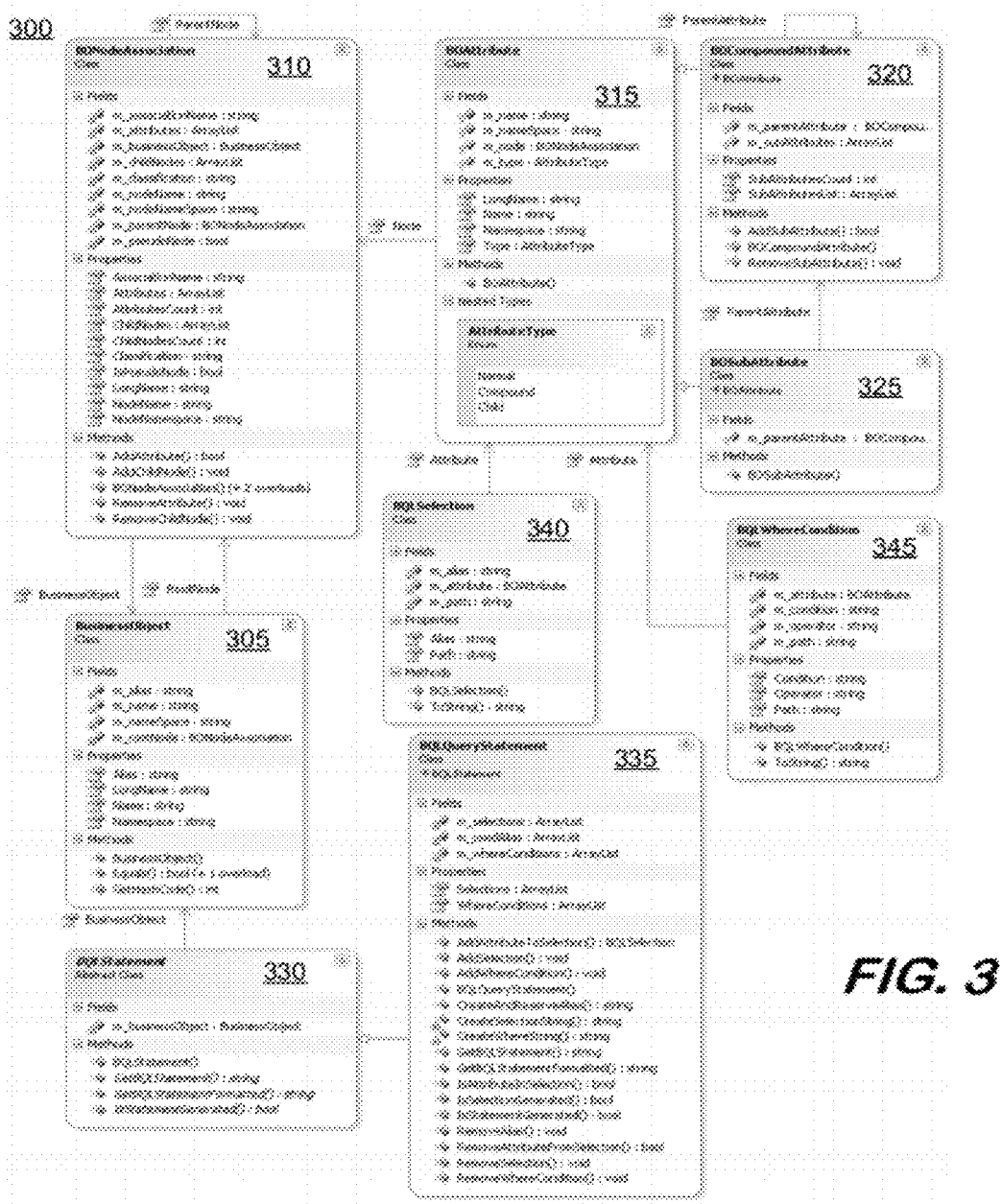
FIG. 3 is an illustrative diagram depicting various BO classes, in accordance with some aspects of the present disclosure.

In some aspects, the searching of BOs and the creation and execution of related BQL statements is related to the structure of the BO data. FIG. 3 provides an illustrative depiction of various example classes associated with BOs, in some embodiments. The class diagram of the BO data also describes the structure of the BOs and the BQL statements used in the BO browser herein. As a brief overview, the various classes associated with a BO, in some embodiments, are depicted in FIG. 3.

"BusinessObject" class 305 represents BOs of a database, data store, service, or application. Various properties of the BO, such as, for example, name and namespace are implemented in this class. It is noted that in some embodiments, the BO knows its root BO Node. In some embodiments herein, a BO has at least one node. The class "BONodeAssociation" 310 captures those nodes associated with BO 305. A node knows its BO, its attributes, and its associated nodes. To simplify the structure, the association is directly integrated in the node class. In some aspects, the node is the target node of the association. The source node is reachable over the property "ParentNode", as illustrated in conjunction with BONode Association 310. The association name and classification are provides as "properties" of "BONodeAssociation" 310.

As discussed herein, the attributes and associations of the BO nodes are central for generating BQL statements. Class "BOAttribute" 315 describes the attributes of the BO node. The attribute knows the node to which it belongs. Attributes include, for example, name, namespace and type (value of the enumeration AttributeType). A "BOAttribute" has the type "Normal", as it neither has sub-attributes nor is it a sub-attribute. The property "LongName" returns the namespace with the attribute name (<namespace>/<attribute name>).

Class "BOCompoundAttribute" 320 is derived from class "BOAttribute" 315 and inherits the attributes of "BOAttribute" 315. Compound attributes may have sub attributes and may also be a sub-attribute of another compound attribute. However, "BOCompoundAttribute" 320 may not, in some embodiments, be part of a selection or a where-condition as they are composed of other attributes and do not have their own value. The sub-attributes of "BOCompoundAttribute" 320 may be stored in an array-list. Therefore, "BOCompoundAttribute" 320 may offer methods for adding and removing child attributes. "BOCompoundAttribute" 320 attributes know their parent attribute. They are of the attribute type "Compound".

Sub-attributes are represented by the class "BOSubAttribute" 325. This class inherits the public and protected properties and methods from the class "BOAttribute" 315. "BOSubAttribute" 325 do not have further sub-attributes. Accordingly, they are leafs within a BO tree. The association "ParentAttribute" describes the upper attribute that is always a compound attribute. Also, sub-attribute is of the attribute type "Child".

Abstract class "BQLStatement" 330 defines that every subclass has to implement methods for returning a BQL statement and for checking if the statement is yet generated. Furthermore, this class may keep an association to the "BusinessObject" class 305 that encompasses the BO on which the BQL statement is created.

The "BQLQueryStatement" class 335 inherits from the "BQLStatement" class 330. In some embodiments, the methods for returning the generated BQL statement are overwritten. These are the methods "GetBQLStatement( )" and "GetBQLStatementFormatted( )". The method for checking whether a statement is generated is overwritten.

"BQLQueryStatement" class 335 knows its selections, respective selected attributes that should be returned, and the defined where-conditions. Therefore, "BQLQueryStatement" class may offer methods to add and remove selections and conditions from the BQL query. The "BQLQueryStatement" class 335 manages the assigned aliases for the selected attributes and the "Root" node. Thus, the "BQLQueryStatement" class 335 provides methods for reserving and removing aliases. In some embodiments, there may be to check or determine the progress of the BQL statement. In some embodiments, a method checks if a fully qualified statement is already generated and another method verifies whether a selection is created. In addition, there may be a routine to confirm if an attribute is already within the selection list.

A "BQLSelection" 340 is a single selection of an attribute for a BQL query statement. Thus, "BQLSelection" 340 holds an association to the according attribute. Additionally, the "BQLSelection" 340 class offers information about the generated alias and the path to the given attribute. For example, the "ToString( )"-method returns the path with alias ("<path> AS <alias>") for the output of the BQL statement.

The "BQLWhereCondition" class 345 stands for a single condition of a BQL where-clause. A condition is connected to a Business Object Attribute 320. Thus, the "BQLWhereCondition" class 345 is associated with the class "BOAttribute" 315 or the subclass "BOSubAttribute" 325. Additionally, the "BQLWhereCondition" class 345 offers information about the path to the corresponding attribute, the defined operator and the specified condition. For example, the "ToString( )"-method returns the string ("<path> <operator> '<condition>'") that is used for displaying the generated BQL statement and for combining the where-clause.

Figure 4:
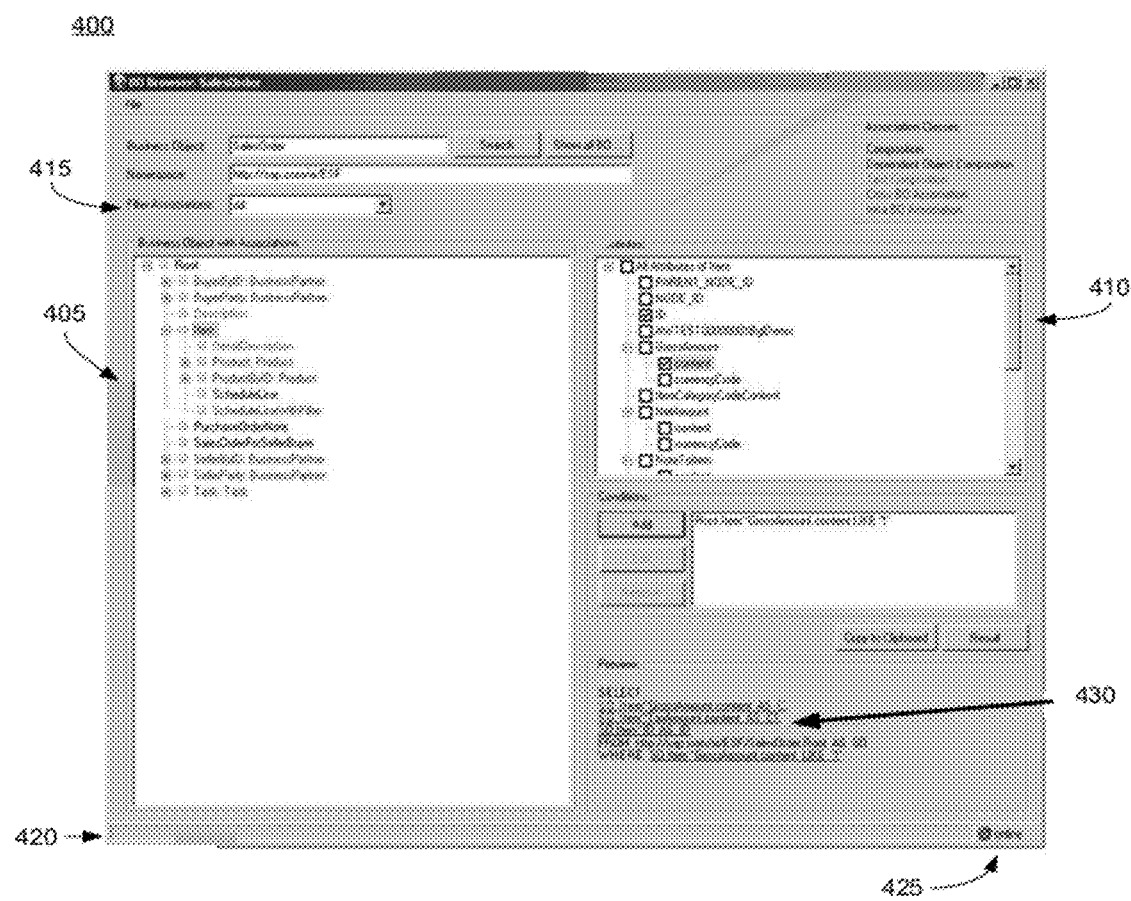
FIG. 4 is a sample screenshot of a graphical user interface, in accordance with some embodiments herein.

FIG. 4 provides an illustrative depiction of a BO browser 400, in accordance with some embodiments herein. The associations of the BO, as well as the attributes of the BO, are displayed within tree-view-controls at 405 and 410, respectively. Tree-view-control 405 allows the arboreal perspective of hierarchical data. The data is represented by tree-node objects. Accordingly, it is suitable to show the hierarchy of a BO with its associated nodes. The tree-view-control 405 may also display checkboxes (or other visual indicators or placeholders) in front of each tree node. The checkbox (or other feature) may have two states: checked and not checked. A third state to indicate sub-nodes are selected may be supported in some embodiments. In some embodiments, an image may be displayed in front of each node to indicate the selection, non-selection, or other states of the node.

Additionally, associated attributes may be selectable by the checkboxes (or other features) at tree-view control 410. In some embodiments, graphical or visual cues or icons may be provided to indicate whether attributes of a node are selected. For example, the color, size, font, or other visual presentation of the node may vary to indicate whether the attribute of a node is selected.

As shown, tree-view-controls 405 and 410 are each embedded into a split-container-control. Conveniently, the split-container-controls facilitate the resizing of the tree views 405 and 410. Accordingly, the width of the controls may be changed or altered by the user to suit their preferences. Additionally, the split-container-controls may be resized to accommodate the data presented therein.

In some embodiments, the presentation of BO associations at 405 may change colors after their classification. As one feature, a filtering for the association classifications is implemented within the BO browser 400 at 415. Using filter 415, a user may choose, via a combo-box-control, whether all classifications or only the efficient should be displayed within the tree-view-control. In some embodiments, tree-view-control 405 may not allow the setting of tree-node objects as "invisible" or hidden. In this instance, the node tree may be rebuilt by each filtering, providing a new tree-node object for every relevant association.

After a BO node is selected via the BO browser 400, the attributes of the BO node are displayed within the attribute tree view 405. First, the BO browser determines whether the attributes were previously requested from the server (i.e., backend). This aspect is recognized on the attribute count of the "BONodeAssocation" instance. If the attributes were not read before, they are requested by sending a BQL meta-data query over RFC to the BO database, system, platform, or service. Upon retrieval, the attributes are displayed within the attribute tree view 405. Again, by retrieving BO data only once when needed, unnecessary or redundant network traffic is avoided. The attributes that were already added to the BQL statement are checked within the tree view. Therefore, the displayed attributes are traversed. If the attribute is within the selection list of the present BQL statement, it is marked in the tree view.

In some embodiments, the associations of a BO node are shown within the tree view 405, after the tree view node representing the BO node is expanded. However, before the expansion the BO browser determines whether the tree node has already appended all of its associated nodes or the pseudo object as child. If just the pseudo object is already added, it is deleted and the actually associated nodes are read by sending a BQL meta-data query over RFC to the BO database, system, platform, or service. Depending on which classifications of associations are to be displayed, the nodes are added to the BO tree.

It is noted that in some embodiments the BO browser does not request all associations and nodes of a BO at once. Yet, a user may like to know (i.e., view) which nodes, if any, have further associated nodes. Therefore, some embodiments herein include a plus (+) symbol in front of the node name in the tree-view-controls 405, 410 to indicate that a BO node has sub nodes and is expandable. Accordingly, a single pseudo object node is added as child to the node. After the user expands a node of the "Tree View" control, the BO browser checks whether the expanded tree node has associated nodes. The first associated node is chosen. Every tree node holds a reference to the displayed Business Object Node. This reference is returned in the next step (accessible over "boNode)". According to this node, the number of associations is read by a BQL meta-data query statement, which is sent to the backend. If the returned number is greater than zero, a pseudo Business Object Node object is created and referred to a new tree node, which is added to the current chosen sub tree node. Afterwards, the next sub tree node is chosen.

Status-strip-control 420 provides status information to the user such as, for example, whether a BO is found or an error occurs in the backend processing of, for example, a BO data request. Additionally in some embodiments, a connection indicator 425 may be integrated into BO browser 400 to indicate whether the browser is online, offline, etc. In some embodiments, BO browser 400 may be periodically and automatically updated. For example, BO browser 400 may be updated every one (1) second. Accordingly, connection indicator 425 may be refreshed every (1) second. In some embodiments, Status-strip-control 420 may display a flag regarding a particular status. For example, status-strip-control 420 may show a flag of a "BQLAccess" object, wherein the "BQLAccess class is responsible for the backend connection. The status flag may be changed if an error occurs during the accessing the supporting BO platform, database, application, or service.

The link-label-control 430 is used to display text information and hyperlinks. Link-label 430 shows the generated BQL statement in the main form of BO browser 400. To remove an attribute selection from a BQL statement, the user may search for the corresponding node within the BO tree view 405 and then the attribute in the attribute tree view 410. To avoid an extended search time, hyperlinks are added to the link-label-control 430 for every selected attribute and condition. By selecting (e.g., clicking) on such a link, the node in the BO tree to which the according attribute belongs, as well as the attribute in the attribute tree, is selected. In this manner, navigation between selected nodes and attributes is efficient using the BO browser 400. In some embodiments, a selected attribute or other BO association may be indicated by a visual indicator such as, for example, by providing a blue link flag for the selected attribute or association.

Figure 4A:
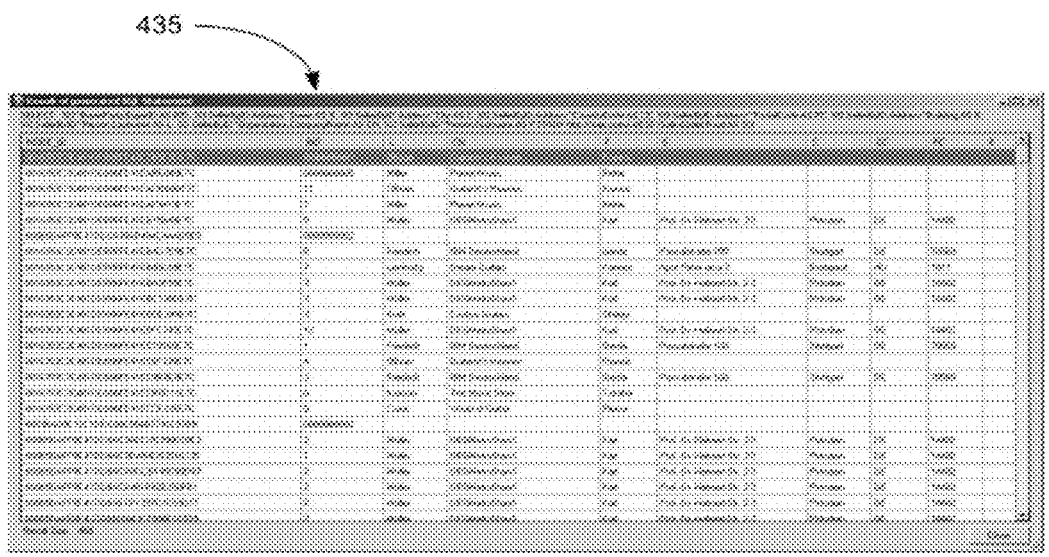
FIG. 4A is a sample screenshot of a result screen of a graphical user interface, in accordance with some embodiments herein.

In some embodiments, the result data of the generated BQL query statement may be presented or displayed on a separate form 435, as shown in FIG. 4A. After selecting the "Result" button on the main form of BO browser 400, a new form 435 is opened. This configuration of the BO browser may be provided to present an uncluttered presentation view of the result.

The screenshot depicted in FIG. 4A shows a sample result data form 435 displaying the result data of an executed BQL query statement. The BQL query statement is repeated on the top of the form and returns test entries from the selected sample BO "SalesOrder". The result data may be arranged within a data-grid-view-control as shown. The data-grid-view-control may display a resizable table. As the result size is dynamic and thus not the same for every request, a data-grid-view-control is provided as a mechanism that allows adapting the displayed view to the result data.

In some embodiments, after a user requests or demands a BO, the root node and its associations are shown. When the user selects the target node of such an association, the outgoing associations and attributes are read from the backend, whereby the time for reading the data is spread over runtime. Furthermore, it is noted that the retrieved data may be buffered once read for later usage. By this method, BO browser 400 may avoid connecting twice (or more) to the backend for the same data.

BQL query statements conform to a special syntax and structure. Some of the particularities, which are considered for the BQL query statement generation, will now be discussed.

Some embodiments herein use aliases in naming in the display of BO data, including names, associations, attributes, and paths. The starting node in a "FROM"-clause and the selected attributes usually have an alias within BQL query statements. This alias defines the name of the attribute within the result set. This alias is generated by the BO browser. In general, the aliases should be meaningful to a user. It is beneficial that the user knows which attribute an alias stands for or is related. Therefore, abbreviations are typically assigned and used as aliases. In some embodiments, the attributes are often named by more than one word, for example "TotalCostAmount", and every word usually starts with a capital letter.

For the alias generation, the capital letters of the attribute name are concatenated as abbreviation. If there is no capital letter in the name, the first letter may be used. In case of the starting node, the alias of the BO is used, as this abbreviation is usually more significant. For example, the root node of the "SalesOrder" BO gets the alias "SO". The attributes are often described by more than one word, for example "TotalCostAmount". In this example, the mentioned alias allocation leads to the alias "TCA".

By the generation of aliases, it is possible that two selected attributes have the same alias after the aforementioned method of alias allocation is performed. Accordingly, some sort of alias management that determines whether an alias has already been assigned and provides alternatives in such cases.

One solution for alias management is to reserve the assigned aliases by storing them in a list. Before assigning a new alias, the list is checked. If the alias is already given to another selection, the new selection gets the alias with a number added. The numeration may start at one and be incremented by one with every subsequent selection that has the same abbreviation. Furthermore, after deselecting an attribute, its alias may be to be removed from the "reserved" alias list.

In some embodiments herein, aliases are generated, used, and allocated. In some instances, the capital letters of the attribute name or BO name are used to provide the alias. Therefore, the regular expression ([A-Z]+) is applied on the name. It is noted that C# offers the class "RegEx" for comfortably searching expressions. Every match is returned within an own "Match" object that are managed in a collection. This collection is traversed. The included strings are concatenated to the alias. If the alias is empty this means the name contains no capital letter, and the first letter of the name is chosen. The allocated aliases are memorized within a list (e.g., "usedAlias") of an instance of the class "BQLQueryStatement". This list is searched for the alias. If instead the alias is a one of a number similar named aliases, a number starting with one, is added to alias as long as the alias is already reserved.

In accordance with some embodiments herein, when metadata of a BO is read from a backend BO database or system, not all of the nodes and attributes of the BOs are requested from the backend at once. Instead, the reading time for the BO data is spread over a runtime to avoid performance issues. For instance, when user selects a BO via a BO browser herein, the times for connecting the backend may generally be defined as follows:

(1) Showing the root node—after the user chooses a BO, the root node is read and expanded;
(2) Displaying the attributes—once the user selects a BO node, the BO node attributes are requested;
(3) Retrieving the associations—before a BO node is expanded, all of its associations are retrieved from the backend; and
(4) Reading the number of associations—after the extension of a BO node, for all associated nodes of the expanded node, the number of their associations is read.

After a BO is searched and it is displayed by the BO browser 400, a new BQL query statement for the BO is instantiated. Additionally, the alias of the BO is created and reserved. Subsequently, the starting node is implemented, added to a new tree node of the BO tree-view-control 405 and a pseudo object is added as a child tree node. The starting node may be expanded immediately since a user may typically want to view the structure of a BO, at least of the starting node. This process begins a transition to the action of retrieving the associations of the BO. In this manner, the user need not, in some instances, manually or separately request a retrieval of the associations of the BO.

In some embodiments, the starting node is set as the selected node of the BO tree view, whereby the action of retrieving the attributes is activated.

In some embodiments, for every attribute within a BQL query statement that is selected or to which conditions are defined, the path of the attribute is needed. As an example, an attribute path is specified by the following string "SO.Item~ID.content". The attribute "content" is a sub attribute of the compound attribute "ID" that is allocated to the node "Item". The node "Item" is an associated node of the root node from the BO "SalesOrder".

Within the BO browser 400, the path is read by recursion. When the selection, respectively the where-condition, is added, the path string is created and assigned to the according object. The creation of the path string may be built according to the follows these steps. First, the attribute path is built. The names with the according namespace of the parent attributes are concatenated separated by a"~". This is separator is used if the attribute is a sub attribute. Then, the node path is constructed by concatenating the names of the parent associations with a tilde. However, the root node of the BO that is the starting point of the path is integrated by its alias and not by the association name. In the previously mentioned example, "SO.Item~ID.content", "SO" is the alias of the starting node.

In general, it is possible to start a BQL query statement from any node of the Business Object. The starting point is defined at the "FROM"-clause of a BQL query statement. However, Applicant has realized efficiencies by constraining BQL query statements generated by the BO browser herein to begin from the root node of a BO. Attributes from deeper node levels are reached over the associations of the BO. Thus, BQL query statements generated in accordance with the BO browsers herein may be assured of being executable without errors.

Figure 5:
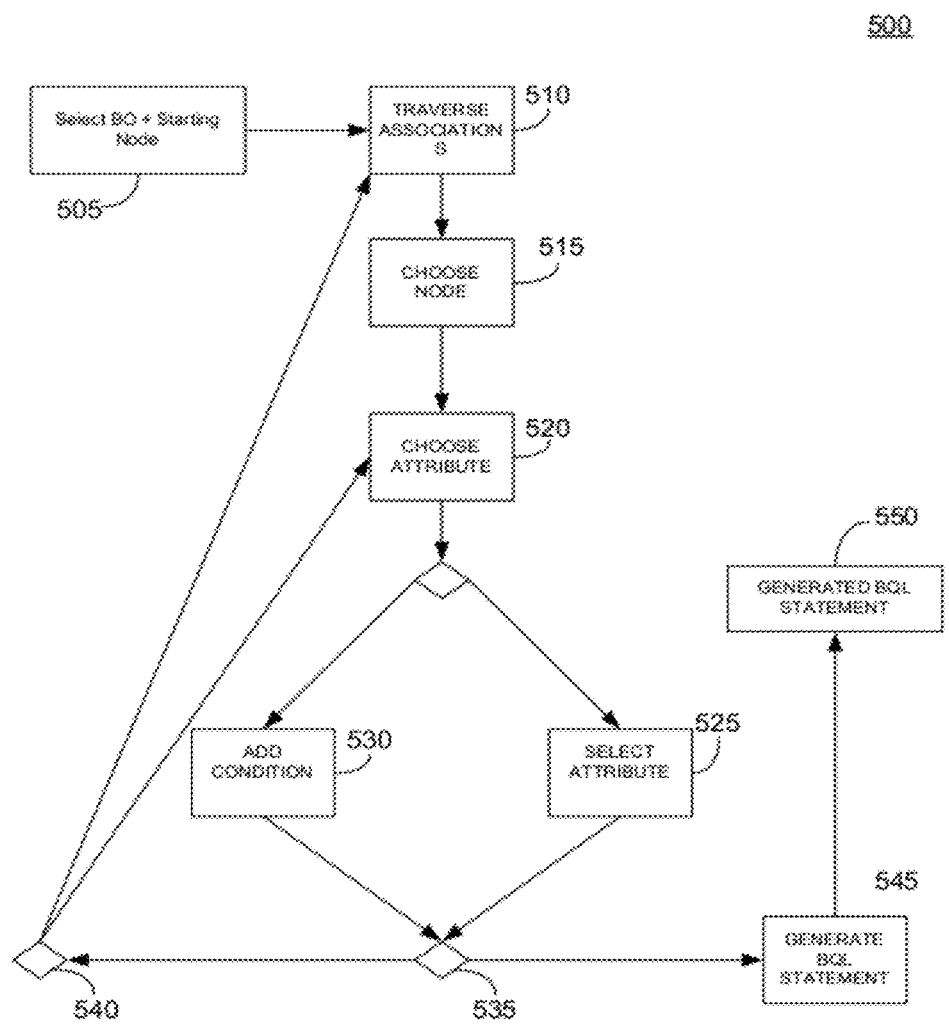
FIG. 5 is an flow diagram of a process, in accordance with some embodiments herein.

FIG. 5 illustrates a flow sequence 500 for creating a BQL query statement, in accordance with some embodiments herein. It shows an approach to create a BQL statement with a BO browser. It is noted that the particular order of operations in process 500 may be altered or varied to include fewer, more, or different operations than those depicted in FIG. 5. Accordingly, the present disclosure is not strictly bound by the flow diagram of FIG. 5.

At operation 510, after a particular BO has been chosen or otherwise specified at 505, the "Create BQL Statement" process 500 commences. As seen, the selected BO is an input parameter of process 500.

Starting at operation 510, the BO associations related to the selected BO are traversed. A BO node that covers a required attribute is chosen or specified at operation 515. The user selects or specifies an attribute of the BO node at operation 520. At this point, conditions and selections are added to the BQL statement being generated. The user may specify additional attribute selections and conditions at operations 525, 530, and 535 to include within the BQL statement. If additional attribute selections and conditions are to be specified by the user as determined at operation 535, the process proceeds to operation 540 where a determination is made whether the additional attribute selections and conditions refer to a different BO node or the same BO node. If a new node the process returns to operation 510, otherwise the process returns to operation 520. In the event no more attribute selections and conditions are to be specified at operation 535, process 500 proceeds to operation 545 to conclude the generation of the BQL statement since all of the BO nodes, associations, and conditions have been fully specified and included within the BQL statement generated by the BO browser. The generated statement is an output parameter 550 of process 500.

It is noted that the BQL statement is automatically generated by the BO browser (e.g., 400) based on and in response to the specification of BO data (e.g., associations, and attributes) specified by the user. In this manner, the user need not manually input or construct the BQL statement. One aspect of this functionality of the BO browser is that the BQL statement syntax errors can be avoided due to erroneous user inputs.

Syntactical mistakes within the BQL statements are excluded as the browser assumes the creation of the statement. The user does not have to type the attribute names or the namespace of the BO that may be very long. Instead, the user selects the desired BO and related attributes to include in the BQL statement and they are automatically inserted into the generated BQL statement. Also, for the where-clause the attribute name is included by the Browser, only the condition has to be inserted by the user.

Figure 6:
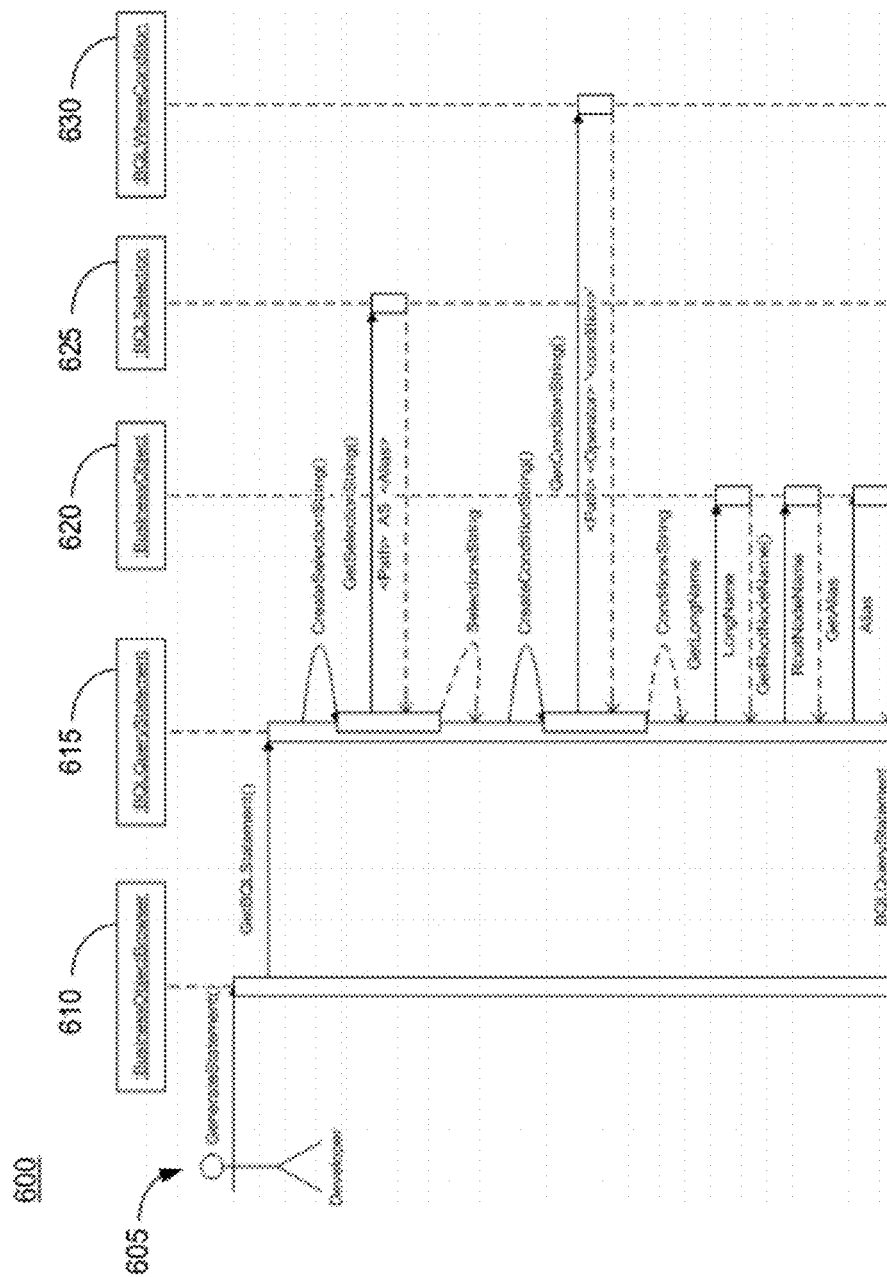
FIG. 6 is a diagram depicting the generation of a BQL query statement, in accordance with some embodiments herein.

FIG. 6 illustrates a sequence 600 for generating a BQL query statement at runtime, in accordance with some embodiments. In advance, the developer (i.e., user) has defined or other wise specified a BO and the selections and conditions for the BQL query statement. FIG. 6 primarily shows the interaction via messages between the affected objects. Consequently, the dynamic behaviour of one task of the BO browser is presented in FIG. 6.

In particular, it is seen that user 605 may initiate a message to generate a BQL statement via the BO browser 610. The BO browser 610 sends a message "GetBQLStatement" to the "BQLQueryStatement" class 615. "BQLQueryStatement" class 615 in turn sends a "GetSelectionString" message to the "BQLSelection" class 625. The "BQLQueryStatement" class 615 subsequently requests conditions from the "BQLWhereCondition" class 630. When all of the attributes, associations, and conditions have been fully specified the names and aliases for the BQL statement are provided by messages between "BQLQueryStatement" class 615 and "BusinessObject" class 620.

In some embodiments, BQL modifier statements such as "UPDATE", "INSERT" and "DELETE" are supported by the BO browser herein. It is noted that modifies usually operate on the BO data after it has been retrieved and displayed by the BO browser. In general, single entries, respectively datasets, are changed or deleted. For example, an update is performed on a special sales order item, like increasing the quantity of an ordered book. Rarely however are all items of a sales order (BO) changed within one operation. Accordingly, BQL "UPDATE" and "DELETE" modifier statements may require a unique identifier of the BO node for the where-clause. This identifier may be the technical identifier of the BO node ("NODE_ID").

In contrast, the "INSERT" modify statement may need a unique identifier of the parent node, if not an instance of the root node is inserted, since a child node has to know its parent.

In some embodiments of the BO browser, "UPDATE" and "DELETE" statements are based on a BQL query result with the result including the BO data that is to be changed or deleted. Accordingly, a BQL query statement is first created that returns the data to be subsequently updated or deleted. Then, a unique attribute is selected. The BO browser should preferably mark attributes that are not unique and are not suitable for deletion or updating. After the attribute selection, the user may decide if a "UPDATE" or a "DELETE" statement is to be generated.

Thus, based on the selected attribute and the chosen statement type, two BQL statements are generated. A query statement that reads via the unique attribute the technical node identifier and a modify statement that updates or deletes the node with the returned node id.

The "INSERT" BQL modifier statement is similar but depends on a parent node instance. Accordingly, the identifier of the parent node instance is used with a INSERT statement. In this case, a child node instance is created from the query result.

In some embodiments, the BO browser herein may be used to invoke BQL action statements. The BO browser may thus display a BQL action statement. Similar to the modify statements, the action statements may operate on a specific BO node instance.

The call statement of a BQL action also the meta-data statement should also be creatable by the Business Object Browser so that inputs of the action statement may be specified from within the BO browser.

Equal or similar to the generation of modify statements, at first the node instance from which the action should be called, is requested by a BQL query statement. Within the result, the node instance is selected and a unique non-technical identifier is chosen by the user. A button such as, for example, "Create Action Statement" opens a separate form in the BO browser. A BQL query statement is generated that requests the technical identifier from the system on basis of the unique attribute of the selected node. On the action form the BQL query is shown and the offered actions of the Business Object Node are listed. The user chooses an action. Depending on this action, the input of the required parameters is provided. After the user input, an action statement is generated. This statement refers to the technical identifier of the node within the "for"-clause and uses the set parameters.

In some embodiments, a BQL statement may be sent to a backend system via a remote function call (RFC) or a web service. Applicant has realized that a RFC may, in a number of cases, prove much faster than web service calls using certain communication protocols (e.g., SOAP protocol). Therefore, RFC calls may be used for accessing a backend system to search and retrieve BO data herein in some embodiments herein.

In some embodiments, BQL access is managed from within the BO browser by a class referred to herein as the "BQLAccess" class. An instance of this class holds the RFC proxy instance that handles the connection to the backend system. Thus, this class offers methods for opening and closing a connection. Additionally, the "BQLAccess" instance provides methods that encapsulate the RFC functions for accessing the BQL engine by the proxy.

In some embodiments, after the user has confirmed an authorized login, an instance of the class "BQLAccess" is created. In this event, a method for opening the connection is called. Within this method, the proxy instance is created and the connection is opened. In the event an error occurs, such as the username or password is not correct or the server data is invalid, an exception is generated. BO browser form handles the exception by displaying an error message within the status bar.

In order to maintain the connection, the BO browser may intercept or catch errors from the remote function calls and try to reconnect a limited number of times (e.g., once) before generating an exception to the user. For this purpose, the classes "RfcCommunicationException" and "RfcSystemException" are overwritten. A constructor is added that accepts a "BQLAccess" instance as a parameter. Within this construct, a reconnect is executed. If the reconnect fails, the same connection is thrown again, but the standard constructor is called.

In some embodiments, the meta data of the BOs, such as the nodes, associations, attributes, etc. are read from the backend with BQL itself. Accordingly, there is one backend connectivity that gets the BQL meta data first by BQL and then retrieves the actual data later when a "real" BQL statement is executed. As an example, a request may be made to get the names and namespaces of all BOs:

```
SELECT BOC~Name       AS BO_NAME,
    BOC~Namespace     BO_NAMESP
FROM bql-model://sap.com/AP/BusinessObjectCatalogue.Root AS BOC
WHERE
 BOC~Namespace LIKE 'http://sap.com/xi/*'
```

Getting the requested data is itself a BQL statement to a catalogue (virtual) BO. It is noted that the same may be done to get all of the associations and attributes of certain BO nodes. Then, a "real" BQL statement may be composed that retrieves "real" Business data. An example of a "real" BQL statement may include the following:

```
SELECT SO~BuyerParty AS BUYER_PARTY,
    SO~TypeCode AS TYPE_CODE,
    SO.Item~Product AS PRODUCT
FROM http://sap.com/xi/ESF/SalesOrder.Root
```

The embodiments herein may be implemented in computer hardware, firmware. The embodiments herein may be implemented in computer software or in combination of hardware and software. Some embodiments may be implemented as a computer program product, i.e., a computer program tangibly embodied in a hardware medium, e.g., in a machine-readable storage device having program code or instructions stored thereof, for execution by, or to control the operation of, a data processor (e.g., a programmable processor, a computer, or network of computers). In some embodiments, a computer program in accordance with the present disclosure may be implemented independent of a particular programming language and/or processing system and/or computer operation or application platform.

Suitable processors for the execution of a program of instructions include, by way of example, both general and special purpose microprocessors, and the sole processor or one of multiple processors of any kind of computer. Storage devices and mediums suitable for tangibly embodying computer program instructions and data may include, for example, all forms of non-volatile memory, magnetic disks, magneto-optical disks, CD-ROM and DVD-ROM disks. In related embodiments, computer program may operate independent of any particular form of programming language, computing system, industry, application, communication protocol, and operating system.

A number of embodiments of the invention have been described herein. However, it will be understood that various modifications may be made without departing from the spirit and scope of the invention. Accordingly, other implementations are within the scope of the following claims.

What is claimed is:

1. A computer-readable medium having computer executable instructions stored thereon to access and manage business object data by a business query language (BQL) business object (BO) browser, the medium comprising:
   instructions for presenting, by the business query language (BQL) business object (BO) browser, a graphical presentation of meta data associated with BO nodes, attributes, and associations of business objects (BOs) associated with an object oriented BO modeled database;
   instructions for a search tool to search for and retrieve specified business object (BO) data located in the BO database, the specified BO data retrieved being meta data associated with BO nodes, attributes, and associations of the specified BO data and limited to that retrieved meta data to create a BQL statement, wherein the search tool is an integrated function within the BQL BO browser;
   instructions for a BQL statement creation tool to automatically generate a BQL statement based on the retrieved meta data of the specified BO data, wherein the BQL statement creation tool is an integrated function within the BQL BO browser;
   instructions for a BQL execution tool to execute the BQL statement generated by the BQL statement creation tool, wherein the BQL execution tool is an integrated function within the BQL BO browser; and
   instructions for displaying an output of a result of the BQL statement executed by the BQL BO browser.

2. The medium of claim 1, further comprising an export mechanism to export a persistence of the generated BQL statement to an application, program, or service interfaced with the BQL BO browser graphical user interface.

3. The medium of claim 1, further comprising instructions for an authentication mechanism to determine whether a user is authorized to use the BQL BO browser.

4. The medium of claim 1, wherein the search tool searches for specific BO nodes, attributes, and associations specified by the user to determine meta data of the BO data to retrieve from the BO database.

5. The medium of claim 4, wherein the BQL statement is automatically generated by the BQL statement creation tool in response to an input of the specific BO nodes, attributes, and associations of the BO data specified by the user in the BQL BO browser.

6. The medium of claim 4, wherein the search tool recursively searches for the specific BO nodes, attributes, and associations in response to a further specification of BO nodes, attributes, and associations by the user.

7. The medium of claim 4, wherein only the specified specific BO nodes, attributes, and associations of the BO data are retrieved from the BO database by the search tool.

8. The medium of claim 1, wherein different classifications of the specific BO associations of the BO data retrieved from the BO database are each presented as different visual indicators in the graphical user interface.

9. A method associated with a business query language (BQL) business object (BO) browser, the method comprising:
   providing, by the business query language (BQL) business object (BO) browser, a graphical presentation of meta data associated with business object (BO) nodes, attributes, and associations of business objects (BOs) associated with an object oriented BO modeled database;
   searching for specified BO data using a search tool of the BQL BO browser, the specified BO data being meta data associated with the BO nodes, attributes, and associations of BOs of the BO database, wherein the search tool is an integrated function within the BQL BO browser;
   retrieving, by the search tool that is an integrated function within the BQL BO browser, BO data associated with the specified BO, the specified BO data retrieved being the meta data associated with the specified BO data and limited to that retrieved meta data to create a BQL statement;
   automatically generating, by the BQL BO browser, a BQL statement using a BQL statement creation tool of the BQL BO browser based on the retrieved meta data of the specified BO data, wherein the BQL statement creation tool is an integrated function within the BQL BO browser;
   executing the generated BQL statement using a BQL execution tool of the BQL BO browser, wherein the BQL execution tool is an integrated function within the BQL BO browser; and
   displaying an output of a result of the BQL statement executed by the BQL BO browser.

10. The method of claim 9, further comprising an export mechanism to export a persistence of the generated BQL statement to an application, program, or service interfaced with the graphical user interface.

11. The method of claim 9, further comprising determining whether a user is authorized to use the BQL BO browser using an authentication mechanism of the graphical user interface.

12. The method of claim 9, wherein the specifying of the BO comprises the user specifying specific BO nodes, attributes, and associations associated with the BO in the BQL BO browser.

13. The method of claim 12, wherein the BQL statement is automatically generated by the BQL statement creation tool in response to an input of the specific BO nodes, attributes, and associations of the BO data specified by the user.

14. The method of claim 12, wherein the search tool recursively searches for the specific BO nodes, attributes, and associations in response to a further specification of BO nodes, attributes, and associations by the user.

15. The method of claim 12, further comprising presenting different visual indicators in the graphical user interface to indicate different classifications of the specific BO associations of the BO data retrieved from the BO database.

* * * * *